T. J. STURTEVANT.
SEPARATOR.
APPLICATION FILED FEB. 23, 1918.
1,353,548.
Patented Sept. 21, 1920.
4 SHEETS—SHEET 1.
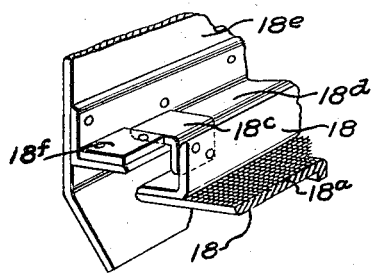
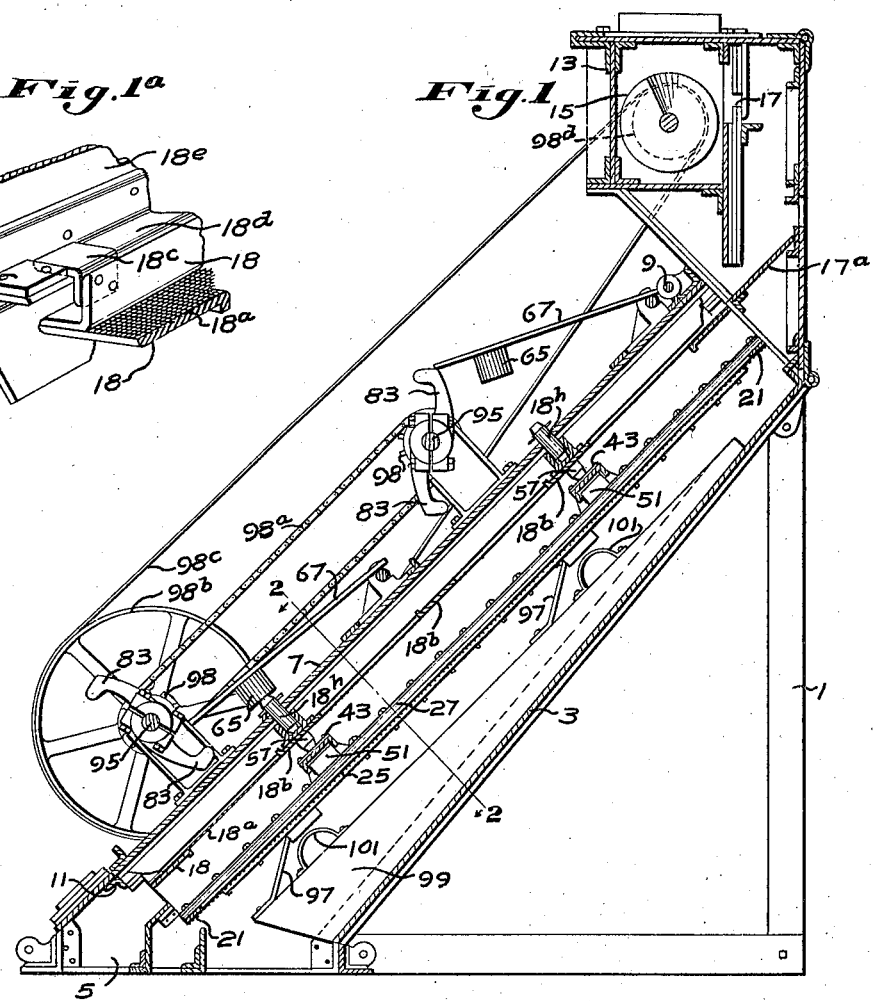
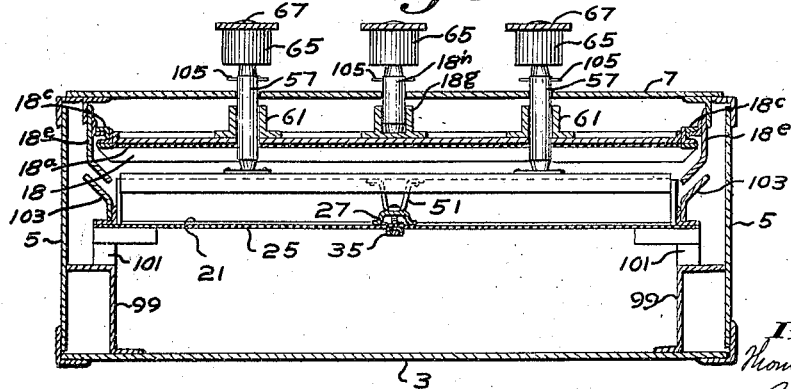

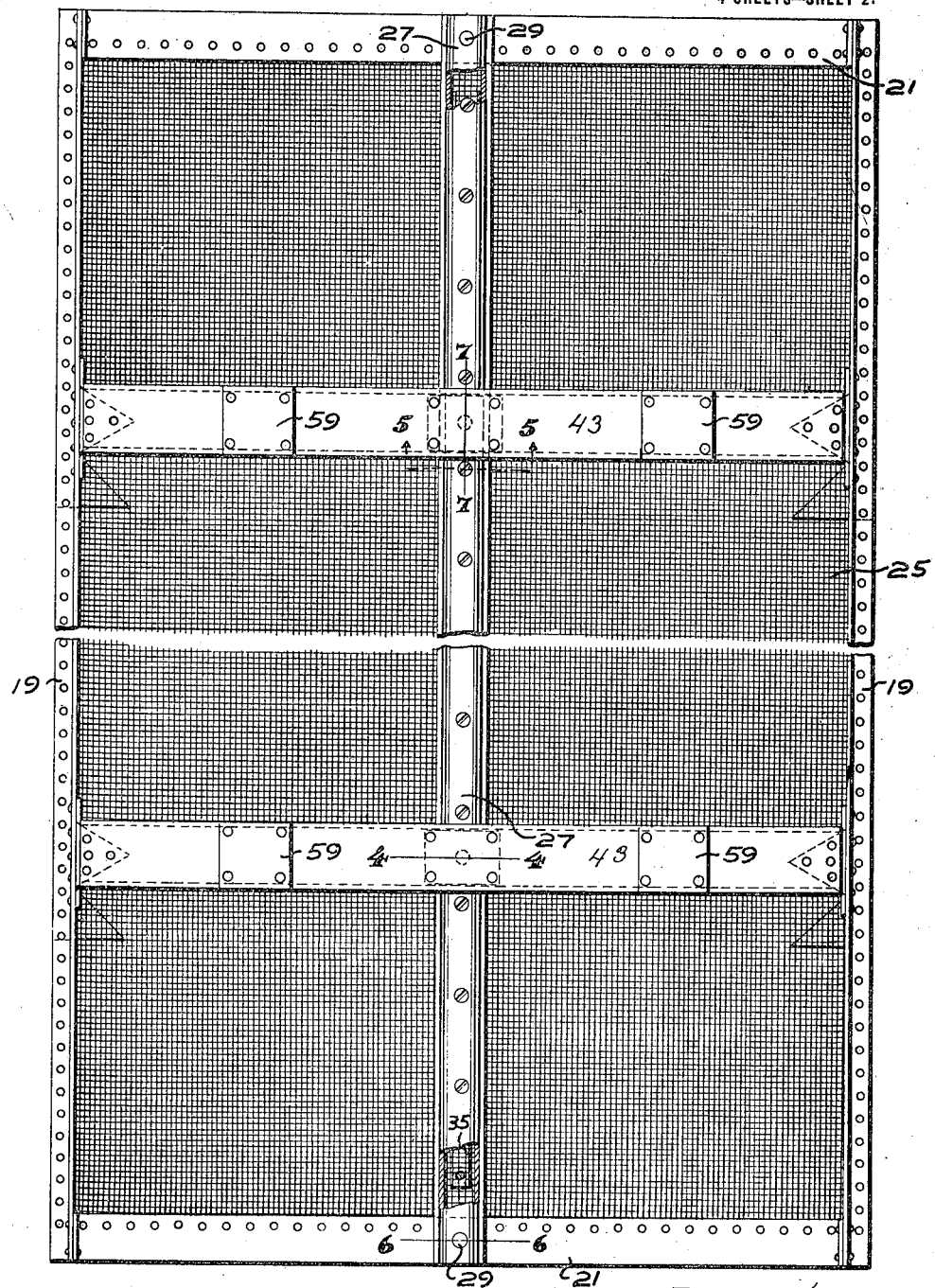

T. J. STURTEVANT.
SEPARATOR.
APPLICATION FILED FEB. 23, 1918.
1,353,548.
Patented Sept. 21, 1920.
4 SHEETS—SHEET 3.
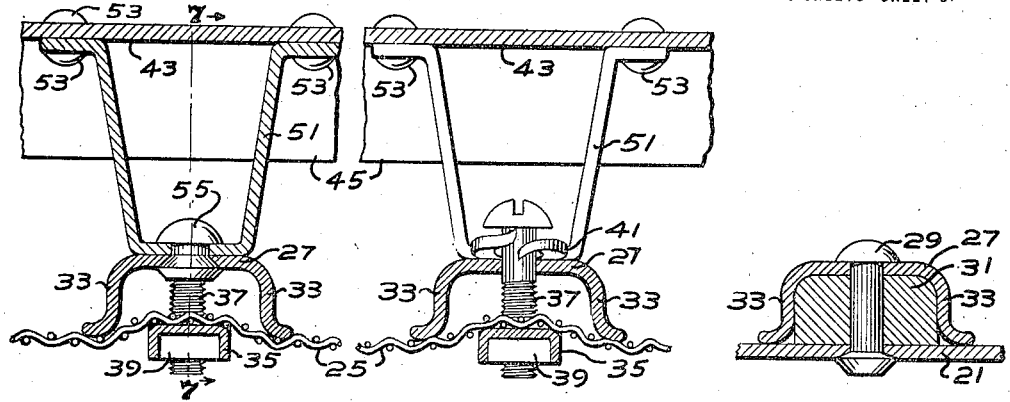
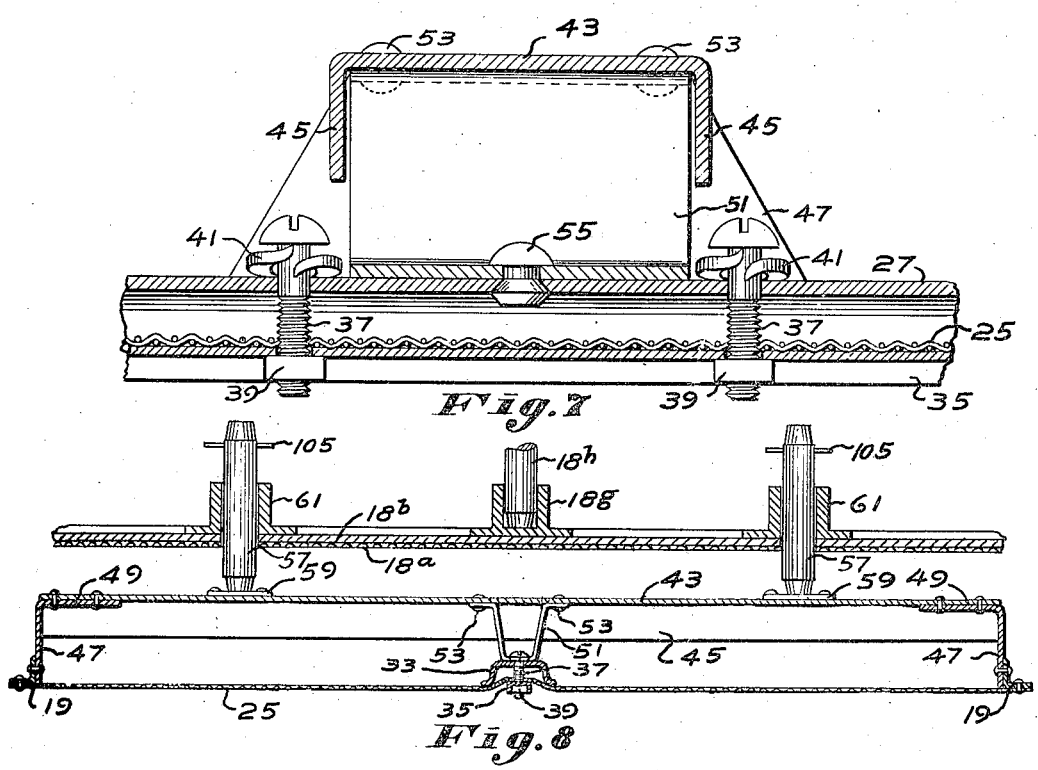
Inventor:
Thomas J. Sturtevant,
by Robt. P. Hains.
Attorney

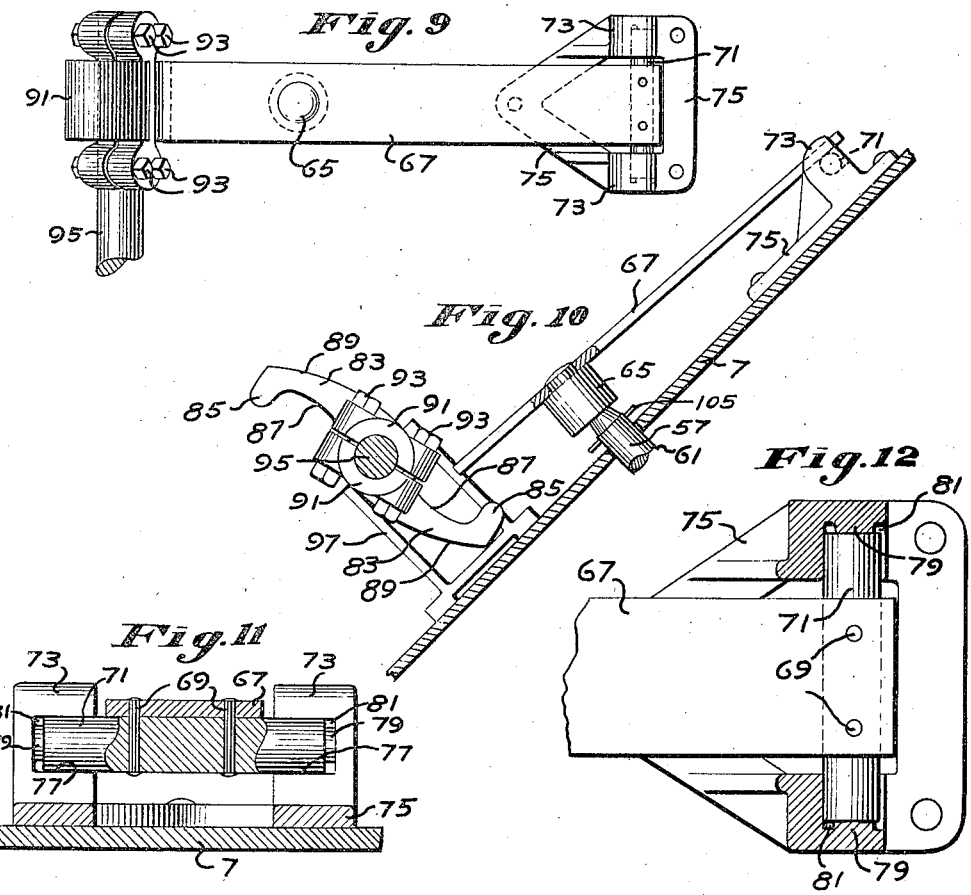

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

SEPARATOR.

1,353,548.     Specification of Letters Patent.    Patented Sept. 21, 1920.

Application filed February 23, 1918. Serial No. 218,649.

*To all whom it may concern:*

Be it known that I, THOMAS J. STURTEVANT, a citizen of the United States, residing at Wellesley, county of Norfolk and State of Massachusetts, have invented an Improvement in Separators, of which the following description, in connection with the accompanying drawings, is a specification, like characters on the drawings representing like parts.

The invention hereinafter described relates to separators for grading materials. These separators usually comprise a casing having a feed box at the top thereof which delivers the material to be graded to the upper surface of an inclined vibrated screen in the casing. The finer material passes through the screen, and the coarser material flows along the screen, the former being delivered through one outlet, and the latter being delivered through another outlet in the casing.

In an application copending herewith, Serial No. 197,330, filed October 18, 1917, is shown, described and claimed a screen having a channel extending longitudinally thereof intermediate the side edges of the screen clothing, the edges of the flanges of the channel being riveted to the clothing. A series of bolts connect said flanges and are adapted to draw said flanges toward one another to tension the screen clothing. This has been found to be a good, efficient form of construction, but the riveting of the flanges of the channels to the clothing after the latter has been applied to the frame, requires the workman to reach in from the edge of the frame over the screen clothing to the series of points of application of the rivets, in order to apply and secure the latter to the flange in the clothing. This has been found to be an inconvenient, expensive operation. One of the purposes of the present invention is to provide a simple, strong and effective stretching means located within the edges of the clothing which may be easily applied thereto and adjusted to tension the clothing.

In said application the screen is provided with a resilient metal bridge bar which crosses the stretching channel and is connected to the side members of the screen frame; and pins struck by hammers rest on this bridge bar, the construction being such that the screen clothing is vibrated without engagement of the pins therewith. When the bridge bar is struck by the blows of the hammers and pins, said bar is vibrated, and since it engages the channel connected to the screen clothing, the latter receives vibrations through the channel in addition to the vibrations transmitted thereto by the bridge bar through the frame of the screen. The bridge bar being resilient, and serving to spread the side members of the frame, may arch up away from the channel somewhat, so that the latter may not always receive the full vibratory effect of the bridge bar. Another object of the invention is to provide a bridge bar and stretching member, such for example as a channel, which are so associated that the channel will receive the vibratory effect of the bridge bar to the fullest extent. The construction may be such that the screen clothing may be alternately slackened and tensioned by forces working in the direction of the plane of the clothing to cause the same to vibrate violently, in a manner analogous to a slack cord, suddenly pulled taut.

Another object of the invention is to provide an improved hammer means for striking the pins. In the present instance of the invention, the hammers are on freely swinging arms which are lifted and dropped by cam means, the construction being such that after the hammers have delivered blows to the pins, they are caught on bounding upward, by the cam means, thereby permitting free, unmuffled vibration of the highly resilient bridge bar, stretcher bar and screen clothing.

With the aforesaid and other objects in view, the character of the invention may be best understood by the following description of one good form thereof shown in the accompanying drawings, wherein:

Figure 1 is a vertical section through the separator shown herein as embodying the invention;

Fig. 1ª is a perspective view of a detail to be referred to;

Fig. 2 is a transverse section taken on line 2—2 of Fig. 1;

Fig. 3 on an enlarged scale is a plan of

Fig. 4 on an enlarged scale is a section taken on line 4—4 of Fig. 3;

Fig. 5 on an enlarged scale is a section taken on line 5—5 of Fig. 3;

Fig. 6 on an enlarged scale is a section taken on line 6—6 of Fig. 3;

Fig. 7 is a section taken on line 7—7 of Fig. 4;

Fig. 8 on an enlarged scale is a transverse section through the scalper and fine screens and showing the pins for transmitting the hammer blows to the screens;

Fig. 9 on an enlarged scale is a plan of a hammer mechanism for vibrating the screen;

Fig. 10 is a view showing the hammer mechanism in side elevation and a portion of the casing cover in section;

Fig. 11 is an end view of the open bearing for the hammer arm, parts being broken away to disclose structure beyond the same;

Fig. 12 is a sectional detail showing the construction of the bearings for the fulcrum stud of the hammer arm; and Figs. 13 to 16 are diagrams illustrating the operation of the screen vibrating mechanism.

Referring to the drawings, the separator shown therein as an exemplification of the invention comprises a frame 1 (Fig. 1) having an inclined casing mounted thereon provided with a bottom 3, side walls 5, and a cover 7 having its upper end connected by a hinge 9 with the casing, and its lower end adapted to rest upon a transverse member 11 adjacent the lower end of the casing.

The upper end of the casing communicates with a trough 13 containing a screw conveyer 15 adapted to feed the material to be graded along the trough over a feed board 17 to an inclined plate 17$^a$, the material passing thence to an inclined screen or screens mounted within the casing.

In the present instance of the invention, two screens are shown, a coarse or scalper screen and a fine screen. The coarse or scalper screen may comprise an angle bar frame 18 (Figs. 1 and 2) having screen clothing 18$^a$ of woven or other suitable screening material stretched thereon, said frame being strengthened by one or more transverse bars 18$^b$ which may have upstanding flanges to baffle or check the flow of material to be screened along the clothing. Suitable means may be provided for supporting the coarse or scalper screen. To this end its frame 18 may have angle brackets 18$^c$ (Fig. 1$^a$) adapted to rest on ledges 18$^d$ on plates 18$^e$ secured to and depending from the casing cover. Stops 18$^f$ limit downward movement of the brackets along the ledges, the construction being such that the screen may be lifted to escape said stops to allow sliding of the screen longitudinally to and from its position beneath the cover as desired.

The fine screen, in the present instance of the invention, comprises a frame (Figs. 1 and 3) having longitudinal side members conveniently in the form of angle bars 19 and end members conveniently in the form of flat bars 21 riveted or otherwise secured to the flanges of the side bars. Screen clothing 25 of woven wire or other suitable screening material may be stretched on said frame and have its edge portions riveted or otherwise secured to said frame. It will be understood that the expression "screen clothing" is to be regarded as generic to any suitable screening structure.

The side members 19 of the frame may be sufficiently light and resilient to allow flexion thereof inward and outward between their points of connection with the end bars to contribute to the vibration of the screen clothing, as more fully hereinafter described.

The means for stretching or tensioning the screen clothing, in the present instance of the invention, comprises a channel 27 (Figs. 4 to 8) extending longitudinally of the screen between the side members 19 thereof, the ends of said channel, in the present instance, being secured by rivets 29 with the end members 21 of the frame, suitable filler members 31 being fitted in the ends of said channels above said members 21 to contribute to the strength of the connection of the channel with said members. The channel has flanges 33, the ends of which may be curved outward somewhat and engage the upper surface of the screen clothing. Suitable means is provided to press the clothing between said flanges toward the back of the channel. In the present instance, this means comprises a channel 35 preferably terminating a short distance from the end members 21 of the screen frame. To adjust the channel 35 relatively to the channel 33, bolts 37 may be entered through the backs of the channels and through the screen clothing and be threaded into nuts 39 fitted in the channel 35. The construction is such that the nuts will be held against rotation by the engagement of their flat faces with the flanges of the channel, and the bolts may be tightened to draw the clothing into the channel 33 to tension said clothing as required. The channels 33 and 35 or one of them may have a longitudinal resilience and flexibility, such that the bolts 37 may be differentially adjusted to vary the tension on the screen clothing at distributed points as required. This is an important feature, since certain portions of the screen clothing experience a greater degree of wear than others, and consequently tend to bag or sag more than others, but by the adjusting means described, the stretching of the clothing at different points may be regulated to maintain the uniform, proper stretched condition of the clothing throughout.

The heads of the bolts 37 may be formed to receive a screw driver for adjusting the same above the screen clothing, and split spring washers 41 may be confined between the heads of the bolts and the back of the channel and serve to permit adjustment of the screws in one direction and lock the same against turning in the opposite direction. Thus, the bolts are conveniently accessible above the screen clothing for tensioning the same as desired.

Preferably the bolts are given an adjustment such that the spring washers will yieldingly connect the channels 27 and 35 and thereby serve as spring means for tensioning the clothing and facilitate flexion of the channels longitudinally thereof in taking up the local bagging of the clothing as described.

In my copending application above mentioned, the hammer blows for vibrating the screen clothing were not applied directly to the clothing, but steel bridge bars were provided having their ends connected to the side members of the screen frame and their portions intermediate said ends spaced a substantial distance above the screen clothing to allow free flow of materials to be graded along the clothing beneath said bars. The screen of the present separator may also be provided with one or more bridge bars, in the present instance, each being in the form of a channel 43 having depending flanges 45, with its ends connected to the side members 19 by plates 47 having their upper ends 49 bent inward and riveted or otherwise secured to the back of the channel, and lower ends each secured by welding and rivets to the upstanding flanges of the side members 19. The construction is such that the bridge bars prevent skewing of the frame of the screen.

These bridge bars may be of highly resilient metal to enable them to vibrate violently on receiving blows from the hammer means to be described. It is desirable that the vibrations of these bars shall be transmitted to the longitudinal member or channel 27 and to the screen clothing with maximum vibratory effect on the latter. To accomplish this, in the present instance, the bridge bars are connected to the channel 27 by U-shaped brackets 51 (Figs. 1, 4 and 5) formed to fit between the flanges 45 of the bridge bars. The upper ends of said brackets may be bent outward and secured by rivets 53 with the backs of the bridge bars 43, and the lower ends of the brackets may be secured by rivets 55 to the back of the channel 27. The construction is such that the vibrations of the bridge bar may be positively transmitted through the brackets and the channel 27 to the screen clothing. When the hammer blows are transmitted to said parts, they will arch beyond their normal positions and continue to vibrate with a gradually decreasing amplitude. Thus, the clothing is alternately slackened and tensioned by forces working in the direction of the plane of the screen clothing and transversely thereto, thereby causing the clothing to vibrate intensely and efficiently grade the material delivered thereto.

Suitable means may be provided for producing the blows on the bridge bars to cause the same to vibrate as described. For this purpose, pins 57 of wood or other suitable material may be provided having lower ends to engage base plates 59 (Figs. 3 and 8) riveted or otherwise secured to said bars. The upper ends of said pins project through guide sleeves 61 (Figs. 1 and 8) mounted on and secured to the transverse bars $18^b$ of the scalper screen, referred to, said pins projecting thence through apertures in the cover 7 and a slight distance above the same to receive the impact of the hammer means.

The hammer means, for each pin, in the present instance, comprises a hammer 65 (Figs. 1, 8 and 10) of varying weight according to the intensity of the blow desired, and having a reduced end riveted to a hammer arm 67, which, in the present form of the invention, is adapted to swing freely after being lifted and then drop by gravity and cause the hammer to strike its pin. The upper end of the hammer arm may be secured by rivets 69 (Figs. 11 and 12) to a stud 71 having its ends journaled in bearings 73 on a bracket 75 riveted or otherwise secured to the cover 7. The upper sides of the bearings 73 may have openings 77 therein through which the stud 71 may pass laterally to and from its bearings. After the stud has been seated in its bearings, the weight of the hammer and arm will tend to pull said stud downwardly and maintain the same in its bearings, as will be noted in Fig. 10. In order that any dust which may accumulate in the ends of the bearings may not interfere with the proper seating of the stud therein, the ends of said bearings may be formed to present abutments 79 surrounded by annular grooves 81.

Suitable means may be provided for lifting and dropping the hammers to produce the blows on the pins. In the present form of the invention, each hammer is provided with an actuator comprising fingers or members 83 (Fig. 10) having ends 85 adapted to successively reach in and engage the under face of the hammer arm 67 at a point a substantial distance from the free end thereof (Fig. 16) to lift the same. Each finger may be formed to present a recess 87 adapted to receive the free end of the hammer arm and allow the engagement of the finger end 85 with the arm as described. The backs 89 of the fingers 83 may be formed to allow the hammer to drop sharply from its position shown in Fig. 13 to its position shown in Fig. 14. In the present instance, two cam fingers are provided projecting diametrically oppositely from boss sections 91 secured by bolts 93 to a shaft 95 journaled in bearings in brackets 97 mounted on and secured to the cover 7. In the present instance, two shafts 95 are provided having sprocket wheels 98 fast thereon connected by a sprocket chain $98^a$, one of said shafts having a pulley $98^b$ fast thereon driven by a belt $98^c$ connected to a pulley $98^d$ on the shaft for the screw conveyer, referred to.

The brackets 97 may be of sufficient height to support the shaft 95 a substantial distance above the cover and thereby allow the use of long fingers to lift the hammers a substantial distance from the upper ends of their pins to produce blows on the latter of the intensity desired. The construction is such that the shaft of the actuator may be located closely adjacent to the free end of the hammer arm and enable the fingers thereof to reach in a substantial distance from the end of said arm and then wipe outward to said end and release the same after lifting the arm a substantial distance.

Hammers and actuators such as described coöperate advantageously with the bridge bars in vibrating the screen clothing. The blows of the hammers are transmitted therefrom by the pins to the bridge bars and are transmitted by the latter to the side members of the frame and to the edge portions of the screen clothing connected to said members. The vibrations of the bridge bars are also transmitted through the brackets 51 and the channel 27 to the screen clothing intermediate its edge portions. Thus, the blows are desirably distributed throughout the screening area of the clothing. This is accomplished without engagement of the pins with the clothing; the clothing is relieved of the weight of the pins and the base plates 59 therefor; local bagging and stretching of the clothing from the hammer blows and the weight of said pins are eliminated, and the entire surface of the clothing between the side members of the frame and the central channel is unobstructed and available for screening purposes. The rotation of each actuator may be properly timed in accordance with the movements of the hammer actuated thereby to produce the most efficient screen vibrating action. For example, a cycle of their operations may be as follows:—

One finger of the actuator may lift the hammer arm to its position shown in Fig. 13. Further rotation of the actuator will move said finger out from under said arm and allow the latter to drop suddenly and permit the hammer to strike an intense blow on the pin beneath it. This will arch the resilient bridge bar down to its position shown in Fig. 14, and thereby arch the screen clothing downward. The recoil of the clothing and bridge bar upward will cause the pin and hammer to bound upward as shown in Fig. 15. In the meantime the other finger of the actuator will have rotated around until it reaches its position shown in Fig. 16, where it will catch the free end of the hammer arm and prevent the latter from dropping back onto the pin between lifting movements thereof by the actuator. As a consequence, the hammer will not muffle the vibrations of the bridge bar and clothing, but will allow a lively, free vibration thereof, desirably contributing to the efficient screening effect of the clothing. Continued rotation of the actuator will again lift the hammer to its position shown in Fig. 13 and thereupon it will be dropped with the cycle of operations repeated as described above. The successive blows of the hammers may be timed so that instead of neutralizing or deadening the vibrations, the amplitude of the latter will be increased.

To vibrate the coarse or scalper screen, sockets $18^g$ (Figs. 1, 2 and 8) may be mounted on the transverse bars $18^b$ of the screen frame and receive pins $18^h$ projecting up through apertures in the cover and somewhat above said cover to receive the blows of the hammer means therefor.

The lower or fine screen may be yieldingly supported in the casing to further contribute to the efficient screening effect thereof. To accomplish this, in the present instance, the side members 19 of the screen may be supported on the free ends of leaf springs 97 mounted on Z-bars 99 resting on the bottom 3 of the casing.

Suitable stops 101 may be mounted on the Z-bars to limit downward movement of the screen. To prevent the material being graded from escape over the side edges of the screen, shield plates 103 (Fig. 2) may be secured to the outer faces of the upstanding flanges of the side members of the screen frame, and said plates may overlap the plates $18^e$, referred to, depending from the cover 7 of the casing.

It is desirable to have convenient access to the scalper and fine screens for purposes of inspection, cleaning and repair thereof. Since the coarse screen is carried by the cover, it will swing upward therewith and thereby readily expose both screens. The pins for transmitting the hammer blows to the screens may have pins 105 projecting therethrough which may drop down to the cover and cause the pins struck by the hammers to be lifted with the cover. The pins 57 projecting through the scalper screen to the bridge bars of the fine screen will move slightly transversely to the length of said bars as the cover swings upward, but since said pins may slide on their flat base plates, there will be no opposition therefrom to said movement by the pins. The hammers and their actuators are also carried by the cover and hence are lifted therewith and do not offer interference with the ready access to the screens.

It will be understood that the invention is not limited to the specific embodiment shown, but that various deviations may be made therefrom without departing from the spirit and scope of the appended claims.

Claims.

1. In a separator, the combination with screen clothing for grading materials, of a frame for said clothing, a vibratory bridge member spaced from said clothing and connected to the sides of said frame, relatively adjustable stretching members for tensioning said clothing, and means connecting said bridge member with said stretching members that vibrations of the former may be transmitted through the latter to the clothing.

2. In a separator, the combination with a frame, of screen clothing thereon, a channel connected to said frame, a member opposed to said channel, means to adjust said member toward said channel to press a portion of said clothing into said channel to stretch said clothing, a vibratory bridge member crossing said channel and connected to said frame, and means to connect said bridge member to said channel, that vibrations of the former may be transmitted to the latter.

3. In a separator, the combination with screen clothing, a support therefor, stretching means for said clothing extending longitudinally thereof intermediate the side edges of said clothing, and means connected to said stretching means for transmitting vibrations to said clothing.

4. In a separator, the combination with screen clothing, of a support therefor, a member extending along said clothing intermediate side edges thereof, a vibratory member extending transversely to said first member, and means operatively connecting said members that vibrations of one may be transmitted to the other.

5. In a separator, the combination with a frame, of screen clothing carried thereby, a member extending along said clothing, a member crossing said member above the clothing, means for imparting successive blows to one of said members, and means for causing the other member to vibrate synchronously therewith.

6. In a separator, the combination with a frame, of screen clothing stretched thereon, transversely disposed members, one connected to said frame and spaced above said clothing, and the other connected to said clothing, means connecting said members together, and means for percussively vibrating one and thereby imparting vibrations to the other and to said clothing.

7. In a separator, the combination with a frame, of screen clothing stretched thereon, transversely disposed channels above the clothing connected to said frame, means connecting one of said channels with said clothing, means connecting said channels, and means operating through said channels for vibrating said clothing.

8. In a separator, the combination with a frame, of screen clothing stretched thereon, transversely disposed, longitudinally flexible members above the clothing, means for causing said members to flex in unison, and means for arching said members to alternately slacken and tension said clothing to vibrate the latter.

9. In a separator, the combination with screen clothing for grading materials, of a support for said clothing, transversely disposed resilient members crossing said clothing and connected to said support, means connecting said members, means connecting one of said members with said clothing, one of said members being spaced from the clothing, a pin to engage the spaced member, and hammer means for imparting blows to said pin to vibrate said clothing.

10. In a separator, the combination of screen clothing for grading materials, a support for said clothing, a resilient arched member having its ends applied to side edges of said clothing, said member being spaced intermediate said ends a substantial distance above said clothing to allow free flow of materials between said member and clothing, means connecting said member with said clothing intermediate said ends, and means for vibrating said arched member.

11. In a separator, the combination of a resilient metal frame, resilient metal crossing members having their ends connected to said frame, screen clothing for grading materials having its edges connected to said frame and a portion intermediate said edges connected to one of said members, means connecting said members at the crossing thereof, one of said members being spaced from the clothing, and means for imparting successive blows to the spaced member to vibrate said crossing members and clothing.

12. In a separator, the combination of screen material for grading materials, of opposed stretching members applied to opposite faces of the clothing, one of said members being longitudinally resilient and flexible, and means to flex said member relatively to the other to differentially tension portions of said clothing.

13. In a separator, the combination of screen clothing for grading materials, a support for said clothing, a resilient member crossing said clothing, a pin to engage said member, a hammer for striking said pin, and actuating means for causing said hammer to strike said pin, said resilient member having provision for throwing said hammer and pin up from said member on recoil of the latter, and said actuating means having provision for catching said hammer before it can strike another blow on said pin.

14. In a separator, the combination of screen clothing for grading materials, a support for said clothing, a resilient member bridging said clothing, means including a hammer for imparting a blow to said resilient member to flex said member toward said clothing and vibrate the latter, and actuating means for energizing said hammer having means to catch said hammer on recoil from its blow and prevent muffling by said hammer of the vibration of said clothing.

15. In a separator, the combination of a screen comprising a frame, screen clothing stretched thereon, a longitudinal member for stretching said clothing extending along said clothing intermediate the sides of said frame, and a bridge member crossing said clothing above said longitudinal member, a hammer for imparting blows to said bridge member, and an actuator for alternately lifting and dropping said hammer.

16. In a separator, the combination of a frame, screen clothing secured thereto, and means applied to the center portion of said clothing within said frame having means for yieldingly stretching the clothing from the sides of said frame.

17. In a separator, the combination of a frame, screen clothing secured thereto, and spring means applied to substantially the central portion of the clothing within said frame for maintaining said clothing under tension.

18. In a separator, the combination of a frame, screen clothing secured thereto, members applied to opposite sides of the clothing, elements connecting said members and springs coöperating with said elements and members for drawing one of the latter relatively to the other to maintain said clothing under tension.

19. In a separator, the combination of a frame, screen clothing secured thereto, a channel connected to the ends of said frame and extending longitudinally of said frame between the sides thereof, a member opposed to said channel at the opposite side of the clothing therefrom, bolts connecting said channel and member, and springs on said bolts for drawing said member toward said channel to tension the clothing.

20. In a separator, the combination of a screen for grading materials, a swing arm having a hammer, a hook-like finger having a tip to reach under and engage said arm a substantial distance from an end of said arm, thereby to lift said arm, then wipe out beyond said end and then drop said arm, means to rotate said finger in a direction to cause the same intermittently to reach under and lift said arm, and a pin coöperating with said hammer to vibrate the screen, said finger having a concave side to clear the outer end of said arm as the tip thereof reaches under the arm during the lifting movement of the finger.

21. In a separator, the combination of a screen for grading materials, and means percussively to vibrate said screen including a pin, a gravity-operated swing arm for delivering blows to said pin, a hook-like finger having a substantially straight back, a concaved or recessed front and a tip offset from said back and positioned to reach under a substantial distance from the end of said arm to engage and lift the same, and means to rotate said finger in a direction to cause the tip thereof to intermittently raise and drop said arm.

22. In a separator, the combination of a casing having an inclined cover, a screen in said casing, a pin projecting up through said cover, a bracket on said cover having an open bearing, a swing hammer arm fulcrumed in said open bearing and depending therefrom, and means intermittently to lift and drop said hammer arm to produce blows on said pin and vibrate said screen.

23. In a separator, the combination of a screen for grading materials, and means for vibrating said screen including a pin, a bracket having open bearings therein with end abutments, a member fulcrumed in said bearings and limited against endwise movement by said abutments, a swing hammer arm secured to said member, and means intermittently to lift and drop said arm to produce blows on said pin.

In testimony whereof I have signed my name to this specification.

THOMAS J. STURTEVANT.